Oct. 30, 1934.　　L. C. SHAPIRO ET AL　　1,978,651
TUNING INDICATOR FOR RADIOS
Filed March 20, 1931　　2 Sheets-Sheet 1

Inventors,
Lazarus C. Shapiro,
Paul A. Chamberlain,
by Walter P. Geyer
Attorney.

Oct. 30, 1934.  L. C. SHAPIRO ET AL  1,978,651
TUNING INDICATOR FOR RADIOS
Filed March 20, 1931  2 Sheets-Sheet 2
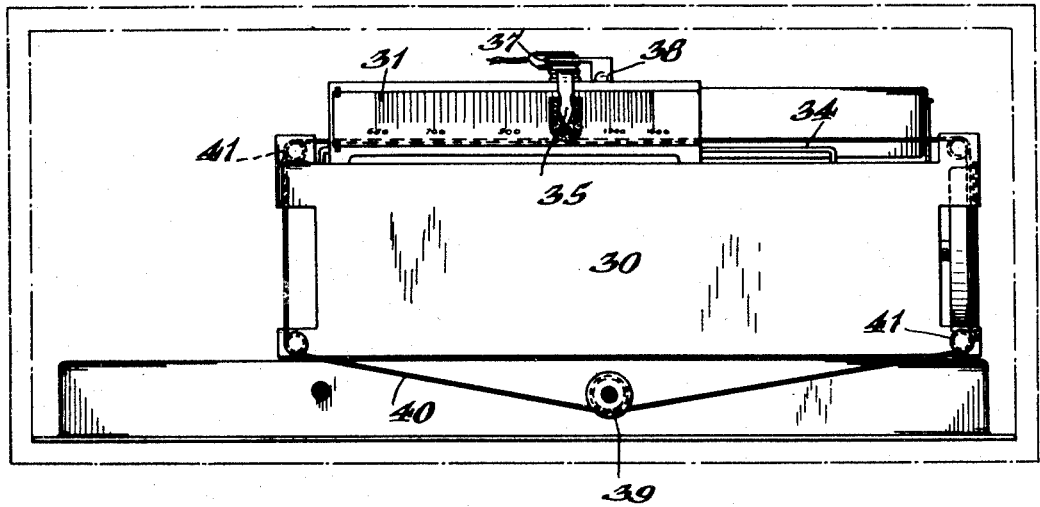
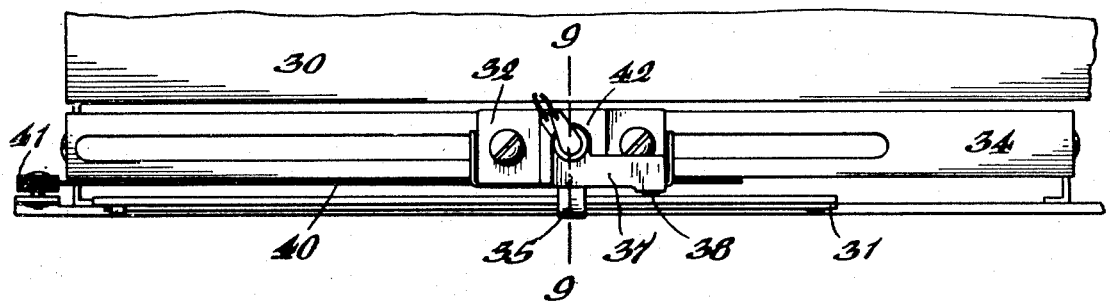
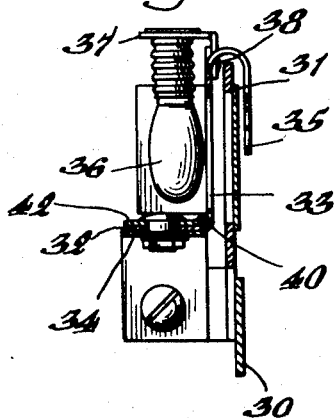
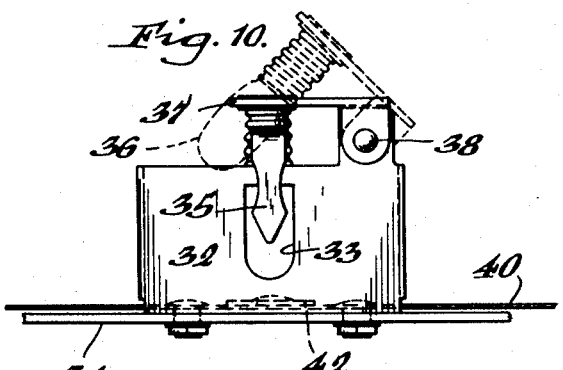
Inventors,
Lazarus C. Shapiro,
Paul A. Chamberlain,
by Walter P. Geyer
Attorney Patented Oct. 30, 1934

1,978,651

UNITED STATES PATENT OFFICE 1,978,651

TUNING INDICATOR FOR RADIOS

Lazarus C. Shapiro, Buffalo, N. Y., and Paul A. Chamberlain, Chicago, Ill., assignors to The Rudolph Wurlitzer Manufacturing Company, North Tonawanda, N. Y., a corporation of New York Application March 20, 1931, Serial No. 524,084

3 Claims. (Cl. 116—124.1)

This invention relates to improvements in the tuning dials or indicators of radio receiving sets.

It has for its primary object to provide a dial of this character which will clearly and effectually indicate the exact tuning positions at a glance from a near or remote point and which affords maximum visibility over a confined area or for a given station-setting position of the dial.

A further object of the invention is the provision of an illuminated, radio tuning dial which is simple, compact and inexpensive in construction and which is readily applicable to the traversing element or pointer of the dial.

In the accompanying drawings:—

Figure 1:
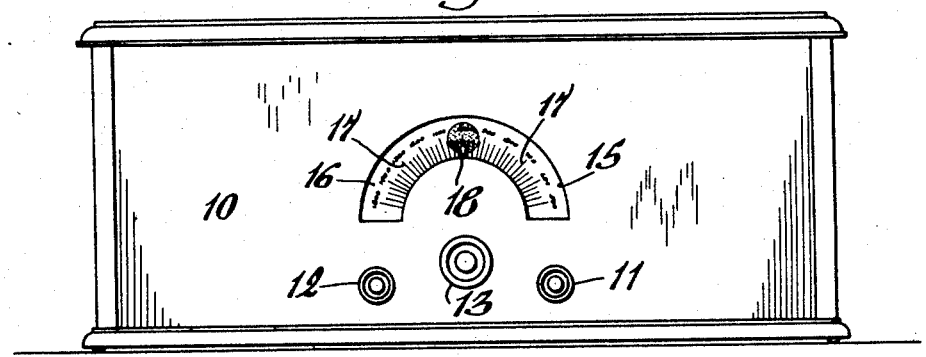
Figure 2:
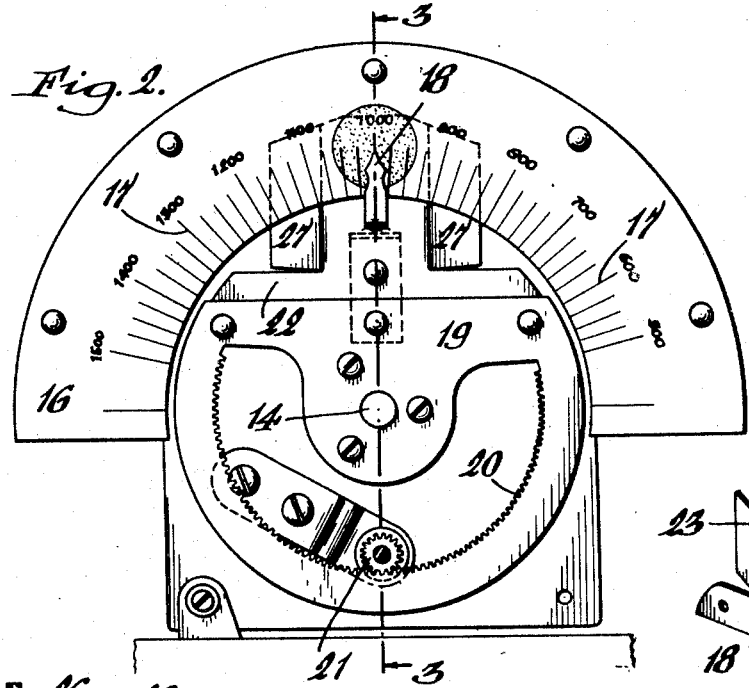
Figure 5:
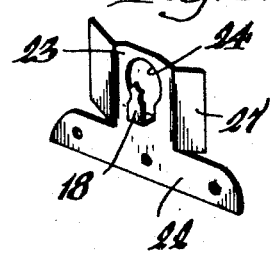
Figure 3:
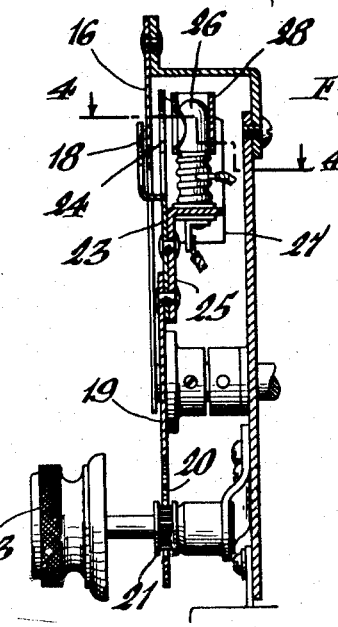
Figure 4:
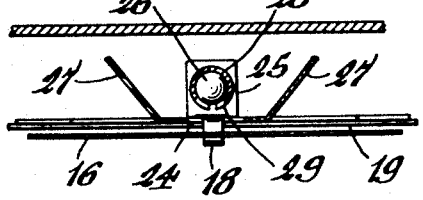
Figure 6:

Figure 1 is a front elevation of a radio receiving set equipped with our improved dial. Figure 2 is an enlarged front view of the dial detached from the set. Figure 3 is a transverse vertical section taken on line 3—3, Figure 2. Figure 4 is a fragmentary horizontal section taken on line 4—4, Figure 3. Figure 5 is a perspective view of the combined indicator and light shield. Figure 6 is a perspective of the light-shielding tube or sleeve. Figure 7 is a front view of a radio chassis showing a modified form of our invention. Figure 8 is a fragmentary top plan view thereof. Figure 9 is an enlarged cross section taken on line 9—9, Figure 8. Figure 10 is a front elevation of the combined light shield and indicator.

Similar characters of reference indicate corresponding parts throughout the several views.

In the embodiment of the invention shown in Figures 1-6, inclusive, we have shown our invention in connection with a radio receiving set 10 having the usual switch and volume control knobs 11 and 12, respectively, and the knob 13 for turning the tuning condenser shaft 14 to various station-settings. Visible through an opening 15 in the cabinet of the set is the dial-scale 16 which may be arcuate in shape, as shown, and provided with the customary kilocycle graduations or indications 17. Traversing this dial-scale and controlled by the tuning knob 13 is a radially-disposed pointer or indicator 18, which as seen in Figures 2 and 3, may be secured to a revolvable, substantially circular plate 19 having a segmental internal gear 20 with which an actuating pinion 21 of the tuning knob meshes.

The dial-scale 16 is preferably made of a translucent or like material which will permit the passage of light through it and the revolvable plate 19 carries means for illuminating the scale at the exact tuning point, the source of light being disposed rearwardly of the scale in line with the indicator 18 and movable therewith to provide a moving spot of light. For this purpose an indicator bearing member is secured to the plate 19 and preferably includes an attaching portion 22 and a light shield 23, the latter extending radially outwardly from said plate to overlie a portion of the dial-scale, as seen in Figures 2 and 3. The indicator 18 may be stamped from the light shield, as shown in Figures 2 and 5, and in line therewith said shield has a light-emitting opening 24 which is shown as circular but may be of any desired ornamental shape. Likewise secured to the revolvable plate 19 and in rear of the indicator-bearing member is a suitable bracket 25 on which an electric lamp 26 having flexible leads is mounted, the same being positioned to project its rays through the opening 24 and onto that portion of the dial scale immediately surrounding the indicator 18.

In order to prevent any stray rays from the lamp interfering with the conspicuous spot-light effect on the dial about the outer end of the indicator, the shield 23 has side wings or extensions 27 which are deflected rearwardly about the sides of the lamp in the manner shown in Figure 4 and deflect the light rays rearwardly away from the dial-scale, thereby leaving the path for the rays confined to the substantially circular opening 24. To further shield the lamp 26, a tube or sleeve 28 may be detachably applied thereto which extends somewhat above the top of the lamp to shield the lamp rays. In its side this tube has a light-emitting opening 29 in line with the corresponding opening 24 in the shield 23.

By this construction, a tuning dial is provided having a conspicuous yet soft glowing spot of light played against the dial scale 16 about the indicator 18 and movable therewith to clearly and effectually indicate the exact tuning positions. As the tuning knob 13 is turned in one direction or the other, the lamp 26 and its shielding members 23, 28 travel with the indicator 18 and thereby afford maximum visibility of that portion of the dial scale immediately surrounding the free or tip end of the indicator.

While the parts are designed to show a substantially circular spot of light, it is to be understood that the indicator may be of any other appropriate design to produce any shape of light-spot desired.

In the modified form of the invention depicted in Figures 7-10, inclusive, the same is shown in connection with a radio chassis 30 having a straight or horizontally-disposed dial scale 31. Movable parallel to this scale along the rear thereof is an indicator consisting of a supporting member or plate 32 having a light aperture 33 therein and guided for movement on a bar or track 34, a pointer 35 carried by said member and overlying the dial scale with its lower end in alinement with said aperture, and a lamp 36 disposed at the rear side of the member 32 and in line with its aperture 33 to direct a concentrated beam of light on the scale in the manner shown in Figure 7. To facilitate the application and removal of the pendant lamp, the same is preferably mounted on a vertically-swinging arm 37 pivoted at 38 to the upper end of the supporting member 32, as seen in Figure 10.

The means for moving the indicator across the scale may be of any appropriate construction, that shown in the drawings, particularly Figures 7 and 8, consisting of an actuating knob 39, an endless cable 40 engaging the same and passing around guide pulleys 41 and anchored to the indicator-bearing member 32 by a suitable clamping plate 42.

We claim as our invention:—

1. In a device of the character described, a dial scale through which light may be passed, a member movable relatively to said dial scale to assume different set positions, a lamp mounted on said member to traverse the rear side of the dial scale, and a sleeve applied to the lamp and having an opening therein for directing a spot of light onto the dial scale.

2. In a device of the character described, a light-pentrating dial scale, an indicator arranged to traverse said scale, a lamp applied to said indicator to traverse the rear side of said scale, and means movable with the indicator and interposed between the dial scale and the lamp for excluding all rays of light from the scale with the exception of a spot of light about the tip end of said indicator.

3. In a radio, a substantially semi-circular dial scale through which light may be passed, a rotatable indicator-bearing member arranged to transverse said scale and carrying an illuminating element arranged to direct a beam of light onto the rear side of said scale, a shield applied to said member for movement across the rear side of said scale and having a light aperture therein opposite the illuminating element, and an indicating pointer applied to said shield and extending into the path of light defined by said aperture.

LAZARUS C. SHAPIRO.
PAUL A. CHAMBERLAIN.